(No Model.)
A. EISMAN.
BICYCLE SUPPORT.
No. 530,330. Patented Dec. 4, 1894.
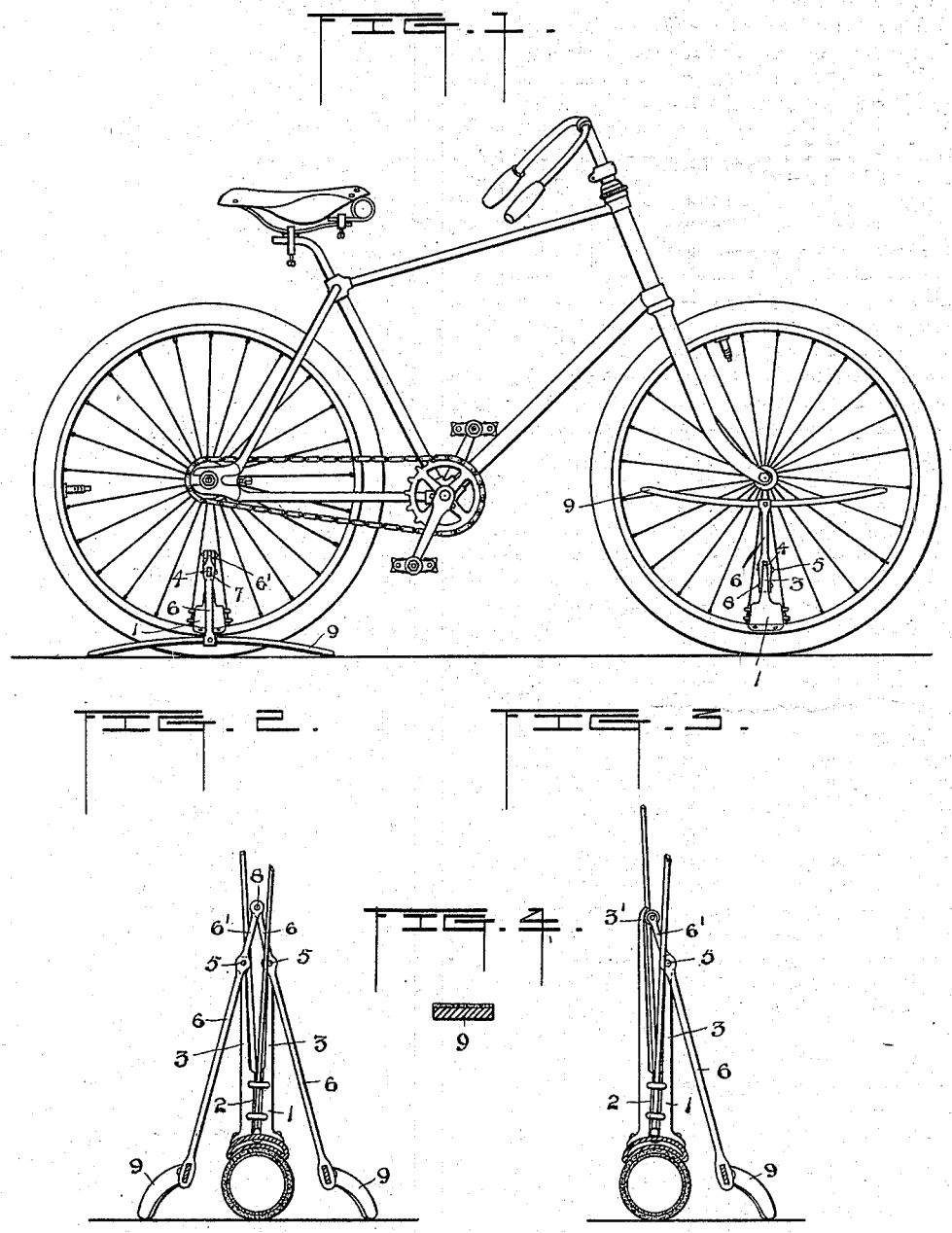

UNITED STATES PATENT OFFICE.

ADAM EISMAN, OF ROCHESTER, NEW YORK.

BICYCLE-SUPPORT.

SPECIFICATION forming part of Letters Patent No. 530,330, dated December 4, 1894.

Application filed April 19, 1894. Serial No. 508,075. (No model.)

*To all whom it may concern:*

Be it known that I, ADAM EISMAN, a resident of Rochester, in the county of Monroe and State of New York, have invented certain new and useful Improvements in Bicycle-Supports; and I do hereby declare the following to be a full, clear, and exact description of the invention, such as will enable others skilled in the art to which it pertains to make and use the same.

The invention relates to a portable support for bicycles and like vehicles, and has for its object to provide such a machine with a fixture that will be securely held on a wheel in either its operative or in its idle position and also to provide for the easy adjustment of such device and for supporting it in close proximity to the central plane of the wheel or positively holding it against the ground or floor; and the invention consists in the construction hereinafter described and particularly pointed out.

In the accompanying drawings Figure 1 is a partial side elevation of a bicycle with the improvement applied to the rear wheel in an operative position and with the same applied to the front wheel in an inoperative position. Fig. 2 is an elevation of the improved device detached taken at right angles to the views in Fig. 1. Fig. 3 is a partial elevation of a modification. Fig. 4 is a section of a detail.

Numeral 1 indicates a block fitted by means of grooves 2 between the ends of two spokes adjacent to the wheel rim and secured to said rim in any convenient manner as by rivets or it may be secured to the spokes. On this block on opposite sides thereof are springs 3. In the free ends of these springs which may be provided with heads 4 are supported the pivots 5 of reversible arms 6. These arms are preferably slotted as at 7 to receive the spring heads and said arms are extended beyond their pivots 5 and the extensions 6' are loosely connected by a pivot 8. At the opposite ends of the arms and transversely thereto are secured elongated feet 9 preferably of curved form. These however may be made straight or angular and may have various lengths. They may also be made elastic. It is preferred to give each of them a bearing on the ground in front of and also in rear of the perpendicular center of the wheel but this is not essential to all the advantages of the improvement. I also propose to face them with rubber or the like to aid in obviating rattling. If desired the ends of the opposite feet 9 when idle may meet between the spokes.

The device will in practice be made mainly of spring steel and polished, nickel plated or otherwise ornamented.

The springs 3 may be supplemented by elastic bands passing about them transversely or by transversely arranged coiled springs and the invention is not limited to particular forms. Other features of construction may also be varied, provided the same mechanical and operative principles are preserved, without departing from the invention.

Normally the springs and pivoted arms will be held near and partly between two adjacent spokes, the feet 9, if made long as represented, being at such times held against several spokes by said spring, and the whole device carried around within the chain wheel, and reach in one case, or within the handle bar posts in the other, by the rotation of the bicycle wheel.

To adjust the support for actual use it is only necessary to swing one of the feet down which has the effect to move both arms about their common pivot 8 the springs 3 being thereby spread at their upper ends in manner to permit the operation and being also put under some degree of tension until the arms are moved below their common pivot whereupon the springs react and carry the feet down and hold them upon the floor or ground.

The feet 9 can be made of steel wire or other suitable material and their extremities are adapted, especially in the preferred form illustrated, to engage the ground or other support in manner to effectually prevent either forward or backward movement of the vehicle as well as to maintain it in a substantially vertical plane.

The whole device being made of light polished steel or like material will not be specially unsightly nor add materially to the weight of the vehicle.

If desired a lock may be provided to hold either the arms or springs and prevent the feet from being swung up by any but the holder of the proper key.

Instead of two supporting arms one might be employed with some good effect as indicated in Fig. 3 in which the arm extension 6' bears upon a post or spring 3' in such manner as to resist in connection with a spring 3, but in a yielding manner, the reversal of the arm whereby said spring 3 is adapted to hold the arm either against the wheel and in a vertical position or against the ground in a downwardly inclined position.

Having thus described my invention, what I claim is—

1. In combination with a wheel of a bicycle or other like vehicle, a spring secured to the outer part of the wheel a reversible supporting arm pivoted to said spring and having a short extension beyond the pivot, and a device arranged in the path of said extension whereby the spring holds the arm in a yielding manner either in its operative or inoperative position, substantially as set forth.

2. In combination with a wheel of a bicycle or other like vehicle, a spring secured to the outer part of the wheel a reversible supporting arm pivoted to said spring and having a short extension beyond the pivot, and a device arranged in the path of said extension whereby the spring holds the arm in a yielding manner either in its operative or inoperative position, said device consisting of a similar arm and spring the extensions of the arms being pivoted together, substantially as set forth.

In testimony whereof I have signed this specification in the presence of two subscribing witnesses.

ADAM EISMAN.

Witnesses:
GEO. J. HILBERT,
CHAS. T. EISMANN.